United States Patent

Wehrli, III et al.

[11] B 3,989,590

[45] Nov. 2, 1976

[54] PRESSURIZED FUEL ELEMENTS FOR NUCLEAR REACTORS

[75] Inventors: Henry A. Wehrli, III, Monroeville; Edmond E. DeMario; Thomas R. Hovanec, both of Pittsburgh, all of Pa.

[73] Assignee: Westinghouse Electric Corporation, Pittsburgh, Pa.

[22] Filed: Sept. 11, 1973

[21] Appl. No.: 396,164

[44] Published under the second Trial Voluntary Protest Program on February 3, 1976 as document No. B 396,164.

[52] U.S. Cl. .................................................. 176/68
[51] Int. Cl.² ......................................... G21C 3/04
[58] Field of Search ............................. 176/68, 79

[56] References Cited
UNITED STATES PATENTS

| 3,291,698 | 12/1966 | Fortescue | 176/68 |
| 3,627,635 | 12/1971 | Smith et al. | 176/68 |
| 3,644,174 | 2/1972 | Ferrari | 176/68 |
| 3,647,622 | 3/1972 | Andrews et al. | 176/68 |
| 3,647,623 | 3/1972 | Hepps et al. | 176/79 |
| 3,671,393 | 6/1972 | Williams | 176/68 |
| 3,759,243 | 9/1973 | Masetti | 176/68 |

FOREIGN PATENTS OR APPLICATIONS

| 1,816,543 | 7/1970 | Germany | 176/68 |
| 829,139 | 2/1960 | United Kingdom | 176/68 |

Primary Examiner—Harvey E. Behrend
Attorney, Agent, or Firm—D. C. Abeles

[57] ABSTRACT

An internally pressurized hermetically clad fuel element for a nuclear reactor having a sealed collapsible capsule within the fuel element plenum. The capsule is controllably collapsed in a buckling mode with increases in plenum pressure to maintain the fuel element pressure substantially constant throughout its operating life.

9 Claims, 6 Drawing Figures

PRESSURIZED FUEL ELEMENTS FOR NUCLEAR REACTORS

CROSS-REFERENCE TO RELATED APPLICATION

This application is a continuation-in-part of application Ser. No. 226,868 filed Mar. 1, 1972, now abandoned.

BACKGROUND OF THE INVENTION

This invention pertains in general to fuel elements for nuclear reactors, and more particularly, to internally pressurized, clad fuel elements which generate fission gases during burn-up.

Many designs of presently manufactured commercial nuclear reactors have their fuel inventory of fissile and fertile material contained within a plurality of elongated metallic clad fuel elements or fuel rods. The fuel rods comprise a tubular cladding member hermetically closed by a pair of end plugs. The fuel generally consists of juxtaposed ceramic pellets, of for example uranium dioxide, contained within the metallic cladding. The exterior of the cladding is exposed to high temperture, high pressure environment. For example, in a pressurized water reactor, a fuel element will be exposed to pressures in excess of 2,000 psi and temperatures above 500°F.

A recent innovation in fuel element manufacture has been to internally pressurize the fuel rods before insertion into the core of a nuclear reactor. This increase in the designed internal pressure of the fuel rods during manufacture offsets the external pressure on the cladding walls in the reactor core during reactor operation and thereby reduces the stresses on the fuel cladding. The reduction in cladding stresses facilitates the manufacture of fuel elements with thinner walls which during reactor operation aids the escape of neutrons to other fuel rods, thus increasing the neutron economy and thereby reducing the cost of reactor operation.

During burn-up of the fissile fuel pellets in the operating reactor, fission gases are released which increase the internal pressure within the fuel rods above the design pressure provided during fuel rod manufacture. Although internal pressurization during fuel rod manufacture greatly reduces the differential pressure across the cladding during reactor operation and thereby increases the reliability of such fuel rods, a problem is created after substantial burnup of the fuel due to the amount of fission gases which accumulate within such fuel rods. This build-up effects the internal and external pressure balance achieved by internal pressurization of the fuel rods during the manufacturing process, thus rendering the fuel rod cladding susceptible to rupture. Thus, in order to manufacture reliable fuel elements and particularly such fuel elements as are to be pressurized during manufacture (hereinafter referred to as pressurized fuel elements), some means must be provided for accommodating the fission gases released during burn-up. An example of such a pressurized fuel element with fission gas accommodating means may be found in U.S. Pat. No. 3,664,174, issued Feb. 22, 1972 by H. M. Ferrari and assigned to the Westinghouse Electric Corporation.

Another solution to the above problem of fission gas accumulation may be found in U.S. Pat. No. 3,647,622, issued Mar. 7, 1972, by H. N. Andrews et al, and assigned to the Westinghouse Electric Corporation. According to this latter application, one or more bellows like members are provided within the interior of the fuel element, each having an internally mounted pin. As fission gases accumulate the various bellows are punctured providing additional void space for fission gas accumulation. However, in both of the above cited applications, plots of the internal pressure versus time for such fuel rods show a saw tooth pattern with deeply decreasing pressure gradients at the predetermined points of internal bellows failure or puncture. A cyclic differential pressure pattern is thereby produced on the cladding. It is possible that the sudden increase in differential pressure, as each bellows intentionally fails, might lead to reduced reliability of the fuel rods, especially where a cladding material having a low modulus of elasticity is used. Unfortunately, materials such as zircaloy which are desirable for use as cladding in nuclear fuel elements because of their relatively low capture cross-section with respect to thermal neutrons, generally have a low modulus of elasticity.

Another solution of the prior art may be found in application Ser. No. 802,544, filed Feb. 26, 1969, by H. M. Ferrari and M. B. L. Hepps and assigned to the Westinghouse Electric Corporation. Here it is suggested that a bellows-like member be internally supported within the plenum of the nuclear fuel element and communicably coupled with the environment of the fuel element so as to maintain an internal pressure substantially equal to the external environmental pressure during burn-up and load follow. The bellows-like member is preferably constructed of a material with a relatively high modulus of elasticity so that it may readily expand or contract to compensate for the amount of fission gas released by the fuel during burn-up. While the latter arrangement is an improvement over the prior art, it has the disadvantage that, if the bellows should fail, coolant will be exposed to the interior of the fuel element, and the fission gases will be released into the coolant.

An additional solution of the prior art which provides for substantially linear compensation of the internal pressure build-up within the fuel element may be found in application Ser. No. 084,302, filed Oct. 27, 1970, by Raymond J. Bratton et al, and assigned to the Westinghouse Electric Corporation. This application provides an internally pressurized hermetically clad fuel element for a nuclear reactor having a normally sealed chamber within the fuel element plenum. The chamber is maintained at a lower pressure than the internal pressure of the fuel element and at least a portion of one of the chamber walls is formed from a permeable membrane material which allows the plenum gases to diffuse into the chamber at a rate comparable to the rate of fission gas release from the fuel during burn-up. The complexity in the design of the membrane and chamber to adequately compensate for the internal pressure build-up detracts from the value of the invention in maintaining fuel element pressure control.

SUMMARY OF THE INVENTION

A relatively inexpensive and more reliable fuel element which is neither subject to a substantial pressure differential across its cladding nor to a varying pressure differential due to fission gas accumulation can be produced in accordance with this invention by providing an internally pressurized fuel element with a sealed collapsible capsule supported within the fuel element plenum. The capsule is controllably collapsed in a predictable manner in a buckling mode with increases in plenum pressure to maintain the fuel element pressure substantially constant throughout its operating life.

In one embodiment, as will be set forth hereinafter, the collapsible capsule is constructed out of a short length of thin walled tubing which is crimped and sealed at both ends. A partial collapse is provided within the wall of the capsule in the form of a dimple. The dimple which initiates and controls the mode of collapse is mechanically formed in one end of the capsule during manufacture of the fuel element.

When the fuel rod pressure equals the initial collapse pressure of the dimpled capsule, initial collapse occurs. When this happens, a slight reduction in rod pressure results. As more fission gas is generated the pressure will increase until it equals the running collapse pressure. The fuel rod pressure will then be maintained at a constant level because as more fission gas is released, the collapse will propogate along the length of the capsule at a rate sufficient to maintain constant rod pressure.

BRIEF DESCRIPTION OF THE DRAWINGS

For better understanding of the invention reference may be had to the preferred embodiment, exemplary of the invention, shown in the accompanying drawings, in which.

DESCRIPTION OF THE PREFERRED EMBODIMENT

Figure 1:
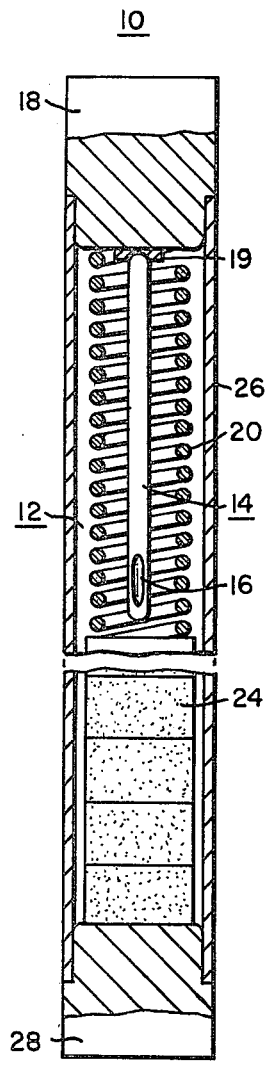
FIG. 1 is a sectional view of a fuel element representing one embodiment of this invention.

Referring now to the exemplary embodiment of this invention illustrated in FIG. 1, there is shown a clad nuclear fuel element 10 constructed in accordance with the principles of this invention which includes a tubular clading member 26 closed at its ends by a pair of end plugs 18 and 28 hermetically secured to the cladding 26 by suitable means such as by welding. The fuel element 10 has a fuel free zone or gas plenum 12 normally located above the fuel pellets 24. The fuel pellets 24 are positioned in a tandem arrangement that extends longitudinally between the lower end plug 28 of the fuel element 10 and the gas plenum 12. The fuel pellets 24 and gas plenum 12 are sealed within the fuel element cladding 26 formed from a suitable material such as zirconium alloy, which extends longitudinally between the two end plugs 18 and 28. A collapsible capsule 14, constructed out of a short length of thin walled tubing, such as 304 stainless steel, crimped and sealed at both ends, is desirably disposed within the plenum 12 and can be exemplary supported by either the retaining spring 20, which functions to hold the pellets 24 compactly in place against the lower end plug 28 or suspended from the upper end plug 18 by the weldment 19 shown in FIG. 1. For a better understanding of the function and purpose of the retaining spring reference may be had to the H. M. Ferrari patent application Ser. No. 850,198, filed Aug. 14, 1969, and assigned to the Westinghouse Electric Corporation.

The object of this invention is to provide a collapsible capsule 14 which slowly collapses at a rate controlled by the internal rod pressure within the gas plenum 12 to maintain a near constant pressure within the rod. The design and function of the collapsible capsule can best be understood by reference to the illustration shown in FIG. 2. The exemplary capsule illustrated is formed from a short length of thin walled tubing which is crimped and sealed on both ends. In one embodiment, a dimple 16, which initiates collapse, is mechanically formed in one end of the capsule. It should be undertstood that other embodiments may be provided in which the dimple is formed at various locations intermediary of the capsule ends.

The dimple is so designed to assure that collapse initiates in a buckling rather than a yield mode. Failure in the buckling mode occurs as an elastic instability which is a function of the modulus of elasticity of the material and not the yield strength. Small deformations are recoverable, however, larger deformations dependent upon the amount of pressure and time applied result in plastic collapse. It is important that the collapsed diameter of the capsule be equal or less than the original diameter in order for the capsule to be most effective. Failure in the buckling mode satisfies this criteria while if the capsule failed in the yield mode an increase in diameter of the collapsed portion would most likely be experienced. It is also important that collapse be predictable under general operating conditions in a reactor. Failure in the buckling mode ensures the desired design predictability inasmuch as the modulus of elasticity is only subject to an approximate one percent change in value due to irradiation over the life of the fuel element. Even this small variation can be minimized by positioning the dimpled portion of the capsule close to the fuel so that collapse propagates away from the fuel and thus away from the source of irradiation. In contrast, failure dominated by the yield mode is dependent on variables that can change fifty to sixty percent over the life of the fuel. Thus, it can be appreciated that providing a capsule collapsible in a buckling mode is an important contribution of applicant's invention.

Figure 2:
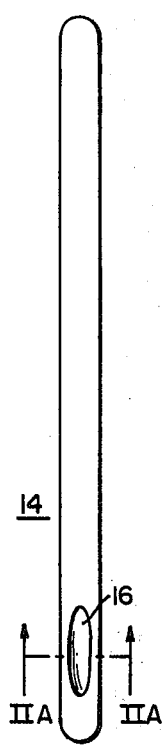
FIG. 2 is a showing of the collapsible capsule deployed within the plenum of the fuel elements of FIG. 1.
Figure 2A:
FIG. 2A is a cross-section of FIG. 2 taken along the line IIA—IIA thereof.
Figure 3:
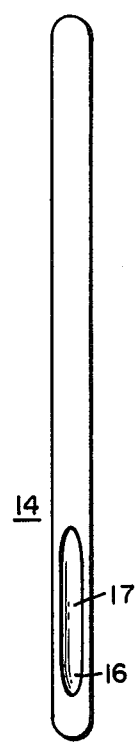
FIG. 3 is a showing of the collapsible capsule of FIG. 2 after collapse has been initiated by an internal pressure build-up within the fuel element of FIG. 1.
Figure 4:
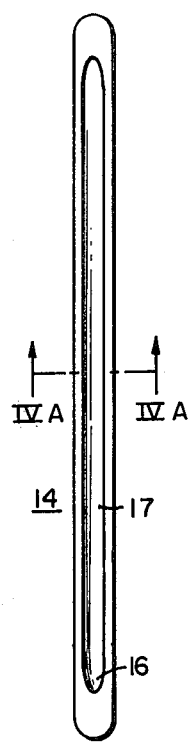
FIG. 4 is a showing of the collapsible capsule of FIG. 3 in the final stage of complete collapse.
Figure 4A:
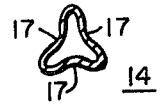
FIG. 4A is a cross-section of FIG. 4 taken along the line IVA—IVA thereof.

The initial dimple manufactured into the capsule not only controls the mode of failure as previously described, but also the number of failure lobes 17 that result from collapse of the material adjacent the dimple 16, effectively expanding the dimples longitudinal length. FIGS. 2, 3 and 4 illustratively show the collapse propagating along a single lobe as it would under the influence of an increase in pressure within the plenum of a fuel element in a reactor during power operation. A single dimple can result in the formation of one, two, or three lobes dependent on the design of the dimple. For example, the dimple shown in FIGS. 2 and 2A will result in the three lobes shown in FIG. 4A even though only one is apparent from the view shown in FIG. 4. The lobe, or lobes, propagate in a straight line down the longitudinal length of the capsule at a rate sufficient to accommodate the additional volume of fission gas accumulated. Furthermore, the elastic nature of initial deformation in the buckling mode accommodates temperature excursions and resulting pressure spikes experienced at the beginning of the operating life of the fuel element in a reactor.

Fuel rod pressure control is maintained by the capsule in the following way. When the fuel rod pressure equals the initial collapse pressure of the dimpled capsule end, initial collapse occurs as seen in FIG. 3. Accordingly, a slight reduction in the fuel rod pressure results (50–100 psi). As more fission gas is generated the fuel rod pressure will increase until it equals the running collapse pressure of the capsule 14. The fuel rod pressure will then be maintained at a constant level, because as more fission gas is released, the collapse will propagate along the length of the capsule at a rate sufficient to maintain constant rod pressure as indicated in FIG. 4. Thus, it will readily be recognized by those skilled in the art, from the aforegoing disclosure, that the running collapse pressure of the capsule 14 can be desirably designed to meet the specification of any particular fuel rod by the judicious choice of material for the capsule tubing, the wall thickness of the tubing, the capsule length or pressurization of the capsule during manufacture.

Accordingly, this invention maintains a substantially constant pressure within a pressurized fuel element by utilizing a collapsible capsule which slowly collapses at a rate controlled by the internal pressure of the fuel element and thereby maintains a near constant pressure within the fuel rod throughout operating life. The advantages of a collapsible capsule, other than its ability to maintain a substantially constant pressure, are the cost advantage provided by its ease of manufacture and its avoidance of cyclic differential pressure patterns which might otherwise subject the fuel rod cladding to rupture.

The total required plenum volume, when utilizing such collapsible capsules can be reduced in view of the fact that a "ballast" or "sacrifice" volume is no longer needed to help reduce pressure excursions as previously required by the prior art. Thermal spikes encountered during reactor operation, which result in pressure spikes, cause only a small reduction in pressure within the fuel rod plenum after the spike is completed when utilizing collapsible capsules. However, when employing prior designs, the spike would normally result in a much lower pressure within the plenum than desired after the spike has receded. Additionally, normally only one capsule is required per fuel element reducing the fuel element costs over prior designs.

Thus, this invention provides a device for controlling the internal pressure of nuclear fuel rods which makes it possible to maintain a near constant pressure within the fuel rod during its operating life. The simplicity of the design results in a relatively low manufacturing cost and greater reliability. Furthermore, plenum volume required to accommodate fission gas accumulation within the fuel rod during reactor operation is less than that required by most prior designs.

We claim:

1. A clad nuclear fuel element comprising an elongated hermetically sealed casing member, nuclear fuel occupying a portion of the interior of said casing member and the remainder of said casing member forming a gas filled plenum pressurized during manufacture with a predetermined volume of gas, at least one hermetically sealed elongated capsule having no extraneous internal support within the capsule, occupying at least a portion of the interior of said plenum out of contact with the casing member, said capsule formed with a depression in a wall of the capsule extending substantially less than the longitudinal dimension thereof, the depression controlling collapse of the capsule in a predetermined manner in a buckling mode, proportionally linearly with increases in gas generation that would result in an increase in pressure above a given designed level within said plenum due to fission gas accumulation generated under irradiation if the capsule did not collapse in a buckling mode, to provide additional volume in said plenum resulting from collapse of the capsule to the extent necessary to accommodate the increase in gas volume to maintain the pressure within said plenum substantially constant throughout the operation of the fuel element under irradiation.

2. The nuclear fuel element of claim 1 wherein the depression in said capsule is prefailed at manufacture past the yield point of the material from which the capsule is constructed in order that initial collapse during operation under irradiation occur in a buckling mode.

3. The nuclear fuel element of claim 1 wherein the depression is mechanically formed as a dimple in a wall of said capsule.

4. The nuclear fuel element of claim 1 wherein said depression is formed only in one end of said capsule.

5. The nuclear fuel element of claim 4 the elongated dimension of said capsule is supported along the longitudinal dimension of the fuel element and wherein the depression is formed at the end of the capsule closest the fuel.

6. The nuclear fuel element of claim 1 wherein the elongated dimension of said capsule is supported along the longitudinal dimension of the fuel element and wherein said capsule collapses in a controlled manner in response to an increase in gas accumulation within said plenum during operation of the fuel element under irradiation extending the depression in a straight line along the longitudinal dimension of the capsule in the form of a lobe at a rate sufficient to maintain said plenum pressure substantially constant.

7. The nuclear fuel element of claim 6 wherein said depression is designed to result in a plurality of said lobes around the circumference of said capsule, each of said lobes expanding the collapse of said capsule along corresponding straight lines parallel to the longitudinal dimension of said capsule in a controlled predictable manner in response to an increase in gas accumulation within said plenum during fuel element operation under irradiation to maintain said plenum pressure substantially constant.

8. The nuclear fuel element of claim 1 wherein said capsule is constructed from a tubular member hermetically sealed at both ends forming an interior chamber filled at manufacture with a predetermined volume of gas designed to control the collapse of the capsule of the desired rate to maintain a substantially constant pressure within the fuel element during fuel element operation under irradiation.

9. The nuclear fuel element of claim 1 wherein said capsule is constructed from stainless steel.

* * * * *